United States Patent
Lee et al.

(10) Patent No.: US 10,322,636 B2
(45) Date of Patent: Jun. 18, 2019

(54) APPARATUS AND METHOD FOR ELECTRICALLY CONNECTING CHARGER TO ELECTRIC VEHICLE

(71) Applicant: Hyundai Motor Company, Seoul (KR)

(72) Inventors: Tae Woo Lee, Gyeonggi-Do (KR); Jin Cheol Shin, Seoul (KR)

(73) Assignee: Hyundai Motor Company, Seoul (KR)

( * ) Notice: Subject to any disclaimer, the term of this patent is extended or adjusted under 35 U.S.C. 154(b) by 223 days.

(21) Appl. No.: 15/373,625

(22) Filed: Dec. 9, 2016

(65) Prior Publication Data
US 2018/0072169 A1 Mar. 15, 2018

(30) Foreign Application Priority Data

Sep. 12, 2016 (KR) .................. 10-2016-0117018

(51) Int. Cl.
*H01M 10/44* (2006.01)
*H01M 10/46* (2006.01)
(Continued)

(52) U.S. Cl.
CPC .......... *B60L 11/1818* (2013.01); *B60L 11/185* (2013.01); *B60L 11/1838* (2013.01); *H01R 31/06* (2013.01); *H01R 31/065* (2013.01); *B60L 2230/16* (2013.01); *Y02T 10/7005* (2013.01); *Y02T 10/7088* (2013.01); *Y02T 90/121* (2013.01); *Y02T 90/128* (2013.01);
(Continued)

(58) Field of Classification Search
CPC ...... H02J 7/0003; H02J 7/0045; H02J 7/0021; H02J 7/0026; H02J 7/0027; H02J 7/355; H02J 7/0042

USPC .................. 320/104, 107, 109, 111
See application file for complete search history.

(56) References Cited

U.S. PATENT DOCUMENTS 8,378,628 B2 * 2/2013 Ichikawa .............. B60L 3/0069
320/109
2014/0035527 A1 * 2/2014 Hayashigawa ..... B60L 11/1818
320/109
(Continued)

FOREIGN PATENT DOCUMENTS

KR 10-1506015 B1 3/2015
KR 10-2015-0107121 A 9/2015
KR 10-2016-0072982 A 6/2016

*Primary Examiner* — Edward Tso
(74) *Attorney, Agent, or Firm* — Mintz Levin Cohn Ferris Glovsky and Popeo, P.C.; Peter F. Corless

(57) ABSTRACT

A charging method and an apparatus of an electric vehicle are provided. The charging is executed via connection even between an electric vehicle and a charger that employ different charging methods, irrespective of a charging method of a charger. The apparatus includes a gender converter that is connected between a vehicle inlet and a charger connector according to one of a DC combo standard specification charger and a CHAdeMO standard specification charger to supply DC power for battery charging, communication, and ground connection between a connected charger and the vehicle. A controller determines specifications of the charger connected to the vehicle inlet from a signal transmitted from the charger and executes high-speed charging according to specifications of the connected charger to perform high-speed charging of a vehicle battery with DC power supplied from the charger.

13 Claims, 6 Drawing Sheets

(51) Int. Cl.
*B60L 11/18* (2006.01)
*H01R 31/06* (2006.01)
(52) U.S. Cl.
CPC ................ *Y02T 90/14* (2013.01); *Y02T 90/16* (2013.01); *Y02T 90/163* (2013.01)

(56) References Cited

U.S. PATENT DOCUMENTS

2015/0035483 A1* 2/2015 Mueller .............. B60L 11/1818
 320/108
2016/0036256 A1* 2/2016 Sukup ................... H02J 7/0052
 320/107

* cited by examiner

NORTH AMERICAN
SPECIFICATION (TYPE 1)

EUROPEAN
SPECIFICATION (TYPE 2)

APPARATUS AND METHOD FOR ELECTRICALLY CONNECTING CHARGER TO ELECTRIC VEHICLE

CROSS-REFERENCE TO RELATED APPLICATION

This application claims under 35 U.S.C. § 119(a) the benefit of priority to Korean Patent Application No. 10-2016-0117018 filed on Sep. 12, 2016, the entire contents of which are incorporated herein by reference.

BACKGROUND

(a) Technical Field

The present disclosure relates to a charging apparatus and method of an electric vehicle, and more particularly, to a charging apparatus and method for enabling charging via connection between an electric vehicle and a charger that employ different charging methods irrespective of a charging method of a charger, thereby enhancing user convenience.

(b) Background Art

Globally, electric vehicles have become popular due to environmental regulations, and research and developments for charging-related equipment and apparatus of the electric vehicle have been conducted. A battery as a power source for driving a vehicle in an electric vehicle (EV) including a plug-in hybrid vehicle (plug-in HEV (PHEV)) may be charged rapidly by connecting a direct current (DC) power source (e.g., high-speed charging equipment) directly to the battery or may be slowly charged by connecting alternating current (AC) power to the vehicle.

In a high-speed charging method, high-speed charging equipment used as DC power converts AC power into DC power, supplies the DC power to a vehicle, is connected directly to a battery of the vehicle to provide high current, and accordingly, a vehicle battery is completely recharged in a short period of time. On the other hand, in a low-speed charging method, when AC power is applied to a vehicle using a commercially available AC power source connected to a distribution system, the AC power is converted into DC power to recharge a battery in the vehicle.

When the low-speed charging method is used, an AC voltage supplied by a commercially available AC power source needs to be converted into a DC voltage in terms of types and sizes and, thus, a low-speed on-board charger (OBC) with a circuit configuration of a power conversion system is installed within a vehicle. To receive battery charging power from external charging equipment (hereinafter, referred to as a 'charger') by an electric vehicle, a charging method of the electric vehicle and a charging method of the charger need to be the same as each other.

However, various types of charging methods for supplying power by a charger and receiving power by an electric vehicle have been developed and have not been globally standardized as one charging method. In particular, various charging methods for connecting a charger and a vehicle by wire have been developed as an electric energy charging method. In this regard, in a low-speed charging method, there are 5 pin-type and 7 pin-type methods and in a high-speed charging method, there are CHADEMO, SGS, and DC combination methods.

Thereamong, the CHADEMO standard is a communication interface for DC charging via connection between an electric vehicle and a high-speed charger and is the Japanese high-speed charging standard and, currently, a high-speed charger of the CHADEMO standard is widely popular throughout North America and Europe. The SGS standard is a communication interface for DC charging via connection between an electric vehicle and a conductive charging system and is the high-speed charging standard determined by the Korea Smart Grid Association.

However, charging standards are different depending on countries and regions and, thus, a different charger that supports the particular charging standard used in a vehicle is required every time charging is performed, and when an electric vehicle and a charger use different charging methods, charging via the charger is not possible.

The above information disclosed in this section is merely for enhancement of understanding of the background of the invention and therefore it may contain information that does not form the prior art that is already known in this country to a person of ordinary skill in the art.

SUMMARY

The present invention provides a charging apparatus and method for enabling charging via connection between an electric vehicle and a charger that employ different charging methods irrespective of a charging method of a charger, thereby enhancing user convenience.

In an exemplary embodiment, a charging apparatus of an electric vehicle may include a gender converter connected between a vehicle inlet and a connector of a charger according to at least one of a DC combo standard specification charger and a CHADEMO standard specification charger to supply DC power for battery charging, communication, and ground connection between a connected charger and the vehicle; and a vehicle controller configured to determine specifications of the charger connected to the vehicle inlet from a signal transmitted from the charger and perform high-speed charging control based on specifications of the connected charger to perform high-speed charging of a vehicle battery with DC power supplied from the charger.

In another exemplary embodiment, a charging method of an electric vehicle may include connecting a gender converter between a vehicle inlet and a connector of one of a DC combo standard specification charger and a CHADEMO standard specification charger or connecting and coupling a connector of the other specification charger directly to the vehicle inlet; determining specifications of the charger connected to the vehicle inlet from a signal transmitted from the connected charger by a vehicle controller; and performing high-speed charging control based on specifications of the connected charger to perform high-speed charging of a vehicle battery with DC power supplied from the charger by the vehicle controller.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
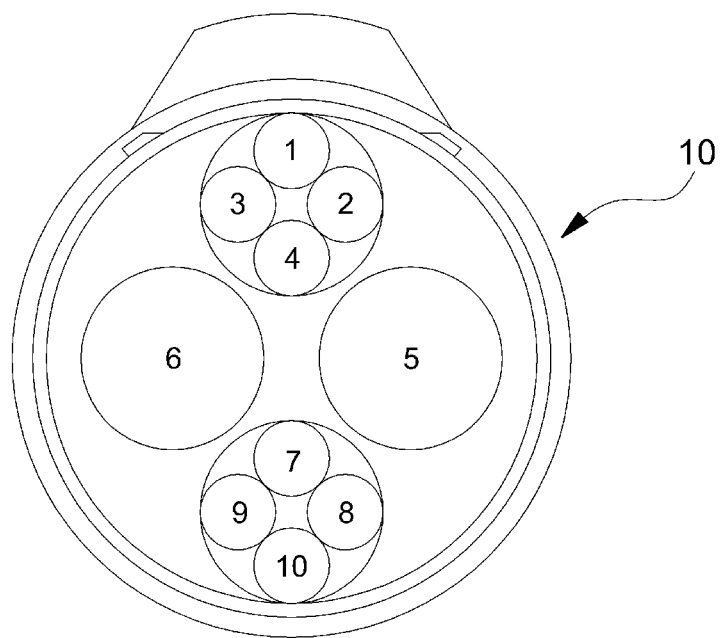
FIG. 1 is a diagram illustrating an example of a vehicle inlet according to the CHADEMO standard specification according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention are described in detail so as for those of ordinary skill in the art to easily implement with reference to the accompanying drawings. However, the present invention may be implemented in various different forms and is not limited to these embodiments.

Exemplary embodiments of the present invention provide a method and apparatus for charging irrespective of a charging method of a charger and for charging via connection even between an electric vehicle and a charger with different charging methods. A representative high-speed charging standard that has been currently applied in North America and Europe is CHADEMO and DC combo and chargers employing each charging standard have been distributed in each area.

According to CHADEMO and DC combo, shapes of a connector of a charger and a vehicle inlet, the types, number, and locations of terminals, and so on are different and, thus, even vehicles in the same area are capable of being recharged at high speed using one method of CHADEMO and DC combo. When one vehicle is capable of using both CHADEMO and DC combo, it may be possible to develop a vehicle model with a single inlet without requiring a vehicle model to be classified and manufactured based on the charging methods. In addition, one vehicle is capable of using both CHADEMO and DC combo and, thus, a problem in terms of charging infrastructure expansion may be overcome.

For reference, according to CHADEMO and DC combo, a charger connector and a vehicle inlet may use both a direct current (DC) charging line (DC+ and − lines) (e.g., a power supply terminal to be described later) and a ground line (e.g., a ground terminal to be described later), and in both specifications of Europe and North America according to DC combo, a control pilot (CP) (e.g., a CP terminal to be described later) other than a DC charging line and a ground line is added. According to the CHADEMO charging standard specification, a vehicle inlet uses nine pins and one pin may remain unused (e.g., pin #3) among a total of 10 pins. CHADEMO has employed controller area network (CAN) communication, DC combo (combination) has employed power line communication (hereinafter, PLC), and CHADEMO and DC combo employ different pins and communication methods.

FIG. 1 is a diagram illustrating an example of a vehicle inlet 10 according to the CHADEMO standard specification. A charger 28 (refer to FIG. 3) of the CHADEMO standard specification, more accurately, a connector of the charger 28 is connected to the vehicle inlet 10. Pin #1 of the vehicle inlet 10 may be a grounding wire terminal, pin #2 may be a charging start/stop terminal (charging start and stop 1 terminal) configured to receive a charging start/stop signal, and pin #3 may remain unused. Pin #4 may be a charging permission/prohibition terminal, pins #5 and #6 may be power supply terminals (#5: power supply (−) terminal and #6: power supply (+) terminal) configured to receive charge power of DC+ and DC−, and pin #7 may be a verification of connector connection terminal. Pins #8 and #9 may be terminals for CAN communication ("CAN-H" and "CAN-L" terminals) and pin #10 may be another charging start/stop terminal (charging start and stop 2 terminal) configured to receive a charging start/stop signal.

Figure 2A:
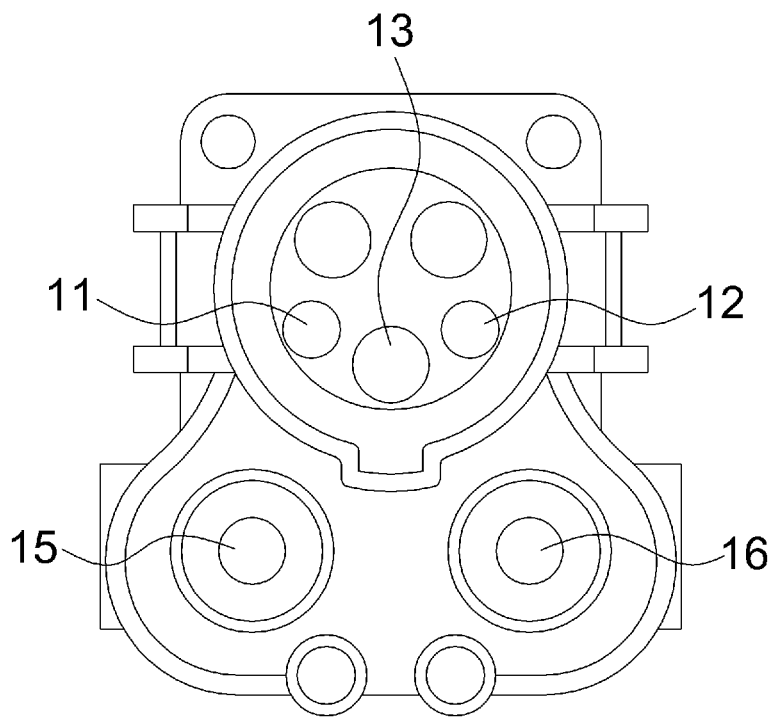
FIGS. 2A-2B are diagrams illustrating examples of a vehicle inlet of DC combo standard specification according to the related art.
Figure 2B:
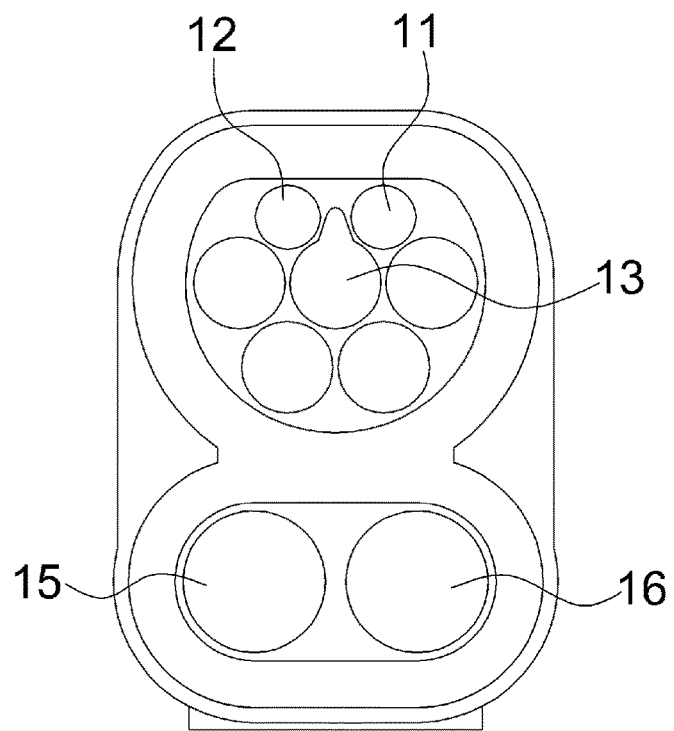

FIG. 2 is a diagram illustrating examples of a vehicle inlet of DC combo standard specification and illustrates North America specification (PLC Type 1) used in North America and Europe specification (PLC Type 2) used in Europe. The inlet illustrated in FIG. 2 may be connected to a charger of the DC combo standard specification, more accurately, a connector of the charger and may include a CP terminal 11 configured to receive a control pilot (CP) signal from the charger, a PD terminal 12 configured to receive a signal indicating that the charger is connected to a vehicle, a grounding wire terminal 13, and power supply terminals 15 and 16 configured to receive charge power of DC+ and DC−. In the inlet of FIG. 2, the remaining terminals may remain unused and PLC communication between the charger and a controller within the vehicle may be performed via the CP terminal 11.

Like the vehicle inlet illustrated in FIGS. 1 and 2, the CHADEMO standard specification and the DC combo standard specification employ different charger connectors (outlets). As described above, the number, types, locations, etc. of terminals (pins) are different between a vehicle inlet for a charger of the CHADEMO standard specification and a vehicle inlet for a charger of the DC combo standard specification and, thus, a battery may be charged using the charger of the DC combo standard specification within a vehicle with the inlet of the CHADEMO standard specification.

In other words, a vehicle may include only one of the inlet of the CHADEMO specification of FIG. 1 and the inlet of the DC combo specification of FIG. 2 and, thus, only one of the chargers of the CHADEMO specification and the charger of the DC combo specification needs to be used for battery charging. When a vehicle has an inlet of the CHADEMO specification, a connector of the charger of the CHADEMO specification may be connected to the inlet to recharge a battery. However, a connector of the charger of the DC combo specification may not be capable of being connected to the inlet and, thus, it may not be possible to recharge the battery using the charger of the DC combo specification.

When a vehicle has an inlet of the DC combo specification, a connector of the charger of the DC combo specification may be connected to the inlet to recharge a battery. However, a connector of the charger of the CHADEMO specification may not be capable of being connected to the inlet and, thus, it may not be possible to recharge the battery using the charger of the CHADEMO specification. Thus, according to exemplary embodiment of the present invention, a gender converter between a vehicle and a charger may be used and may allow use of the charger of the DC combo specification as well as the charger of the CHADEMO specification.

Both of the chargers using the two methods may be used using the gender converter. In particular, the gender converter may include an inlet for connection with a charger connector of one of the DC combo specification charger and the CHADEMO specification charger and an outlet that may be connected with a vehicle inlet of the other specification charger from the specification charger used in the inlet among the DC combo standard specification and the CHADEMO standard specification.

According to an exemplary embodiment of the present invention, the gender converter may be configured to be used to connect a charger of the DC combo specification and a vehicle inlet of the CHADEMO specification. In other words, a vehicle with an inlet of the CHADEMO specification may be configured to charge the battery using the charger of the DC combo specification and, thus, the gender converter may be connected between the vehicle inlet of the CHADEMO specification and the connector of the DC combo charger. The gender converter may be connected between the vehicle inlet of the CHADEMO specification and the connector of the DC combo specification charger to recharge a vehicle battery.

Hereinafter, in the specification, a vehicle inlet of the CHADEMO standard specification is referred to as a CHADEMO inlet, a charger of the CHADEMO standard specification is referred to as a CHADEMO charger, a vehicle inlet of the DC combo specification is referred to as a combo inlet, and a charger of the DC combo specification is referred to as a combo charger.

Figure 3:
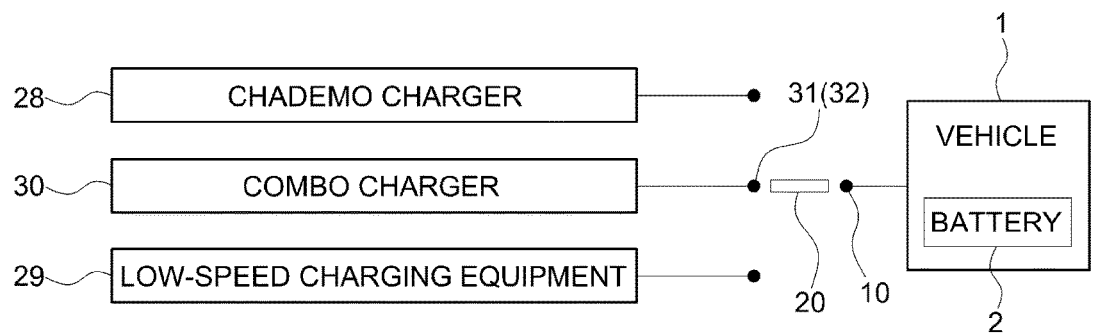
FIG. 3 is a diagram illustrating a CHADEMO charger, a combo charger, low-speed charging equipment, a gender converter, and a vehicle according to exemplary embodiments of the present invention.
Figure 4:
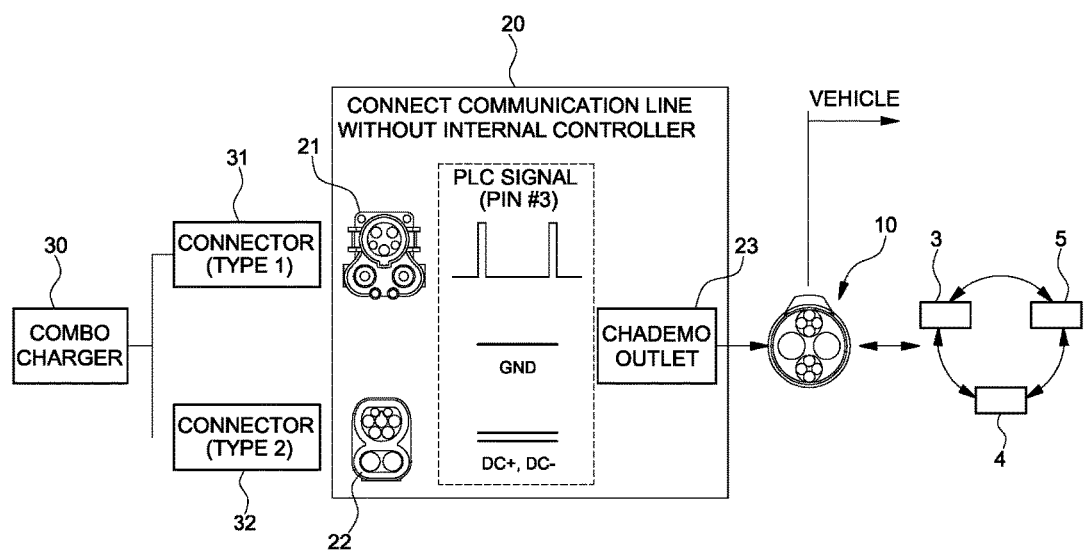
FIG. 4 is a diagram illustrating an example of connecting a combo charger to a CHADEMO vehicle inlet using the gender converter according to exemplary embodiments of the present invention.

FIG. 3 is a diagram illustrating a CHADEMO charger 28, a combo charger 30, low-speed charging equipment 29, a gender converter 20, and a vehicle 1 according to exemplary embodiments of the present invention. FIG. 4 is a diagram illustrating an example of connecting the combo charger 30 to a CHADEMO vehicle inlet 10 1 using the gender converter 20.

Although FIG. 4 illustrates two connectors 31 and 32 connected to the combo charger 30, in reality, the combo charger 30 may be a charger including only one of the two connectors 31 and 32. As illustrated in the drawings, the gender converter 20 may be connected between the connectors 31 and 32 of the combo charger 30 and the CHADEMO vehicle inlet 10 and may enable electric and communication connection between the connectors 31 and 32 of the combo charger 30 and the CHADEMO vehicle inlet 10 and between the combo charger 30 and a vehicle.

In other words, even when a vehicle having the CHADEMO vehicle inlet 10 and the combo charger 30 have different charging methods, the vehicle and the combo charger 30 may be connected by the gender converter 20 to enable DC power supply, grounding, and communication for high-speed charging. The gender converter 20 may include combo inlets 21 and 22 mechanically connected to the connectors 31 and 32 of the combo charger 30 and a CHADEMO outlet 23 mechanically connected to the CHADEMO vehicle inlet 10.

Although FIG. 4 illustrates the combo inlets 21 and 22 in the gender converter 20, in reality, the gender converter 20 may include only one of the two combo inlets. In particular, the combo inlets 21 and 22 may include a plurality of terminals and the terminals of the combo inlets 21 and 22 may be connected to the terminals of the connectors 31 and 32 of the combo charger 30 during connector connection. The CHADEMO outlet 23 may include a plurality of terminals and the terminals of the CHADEMO outlet 23 and the terminals of the CHADEMO vehicle inlet 10 may be connected when the CHADEMO vehicle inlet 10 and the CHADEMO outlet 23 are connected.

In other words, the combo inlets 21 and 22 may be mechanically engaged with and coupled to the connectors 31 and 32 of the combo charger 30, and when the combo inlets 21 and 22 are coupled to the connectors 31 and 32, terminals of the combo inlets 21 and 22 and terminals of the connectors 31 and 32 may be connected, and the combo inlets 21 and 22 may be configured in the same way as an existing combo inlet (refer to FIG. 2) of a vehicle in terms of shape, coupling structure, terminal, and so on. As described above, to be used according to regions, the combo inlets 21 and 22 may be configured as a structure (PLC Type 1 inlet structure) to be connected to a connector of the North American specification combo charger or a structure (PLC Type 2 inlet structure) to be connected to a connector of the European specification combo charger.

The CHADEMO outlet 23 may be configured as a structure mechanically coupled to the CHADEMO vehicle inlet 10 and a structure coupled to the CHADEMO vehicle inlet 10 via connection of terminals of the both sides, and may be configured in the same way as an existing connector of the CHADEMO charger 28 in terms of shape, coupling structure, terminal, and so on.

The gender converter 20 may include a communication line for electrical connection between a CP terminal of the combo inlets 21 and 22 and terminal #3 of the CHADEMO outlet 23, in which power line communication (PLC) may be performed, and a ground line for electric connection between the grounding wire terminal of the combo inlets 21 and 22 and terminal #1 as the grounding wire terminal of the CHADEMO outlet 23. Particularly, terminal #3 of the CHADEMO outlet 23 may be a terminal connected to pin #3 that is an unused terminal among terminals (pins) of the CHADEMO vehicle inlet 10.

The gender converter 20 may include a DC power line (DC+ and DC-) for electrical connection between a power supply terminal (i.e., two power supply terminals configured to receive charge power of DC+ and DC-) of the combo inlets 21 and 22 configured to receive DC charge power from the connectors 31 and 32 of the combo charger 30 and terminals #5 and #6 (i.e., two power supply terminals configured to output charge power of DC+ and DC-) of the CHADEMO outlet 23 for supply of DC charge power.

In particular, terminal #3 of the CHADEMO outlet 23 may be a terminal connected to pin #3 of the CHADEMO vehicle inlet 10 and, according to exemplary embodiments of the present invention, terminal #3 of the CHADEMO outlet 23 in the gender converter 20 and pin #3 (which is an unused pin, conventionally) of the CHADEMO vehicle inlet 10 connected to terminal #3 of the CHADEMO outlet 23 in the gender converter 20 may be additionally used for communication between the combo charger 30 and the vehicle. Accordingly, when high-speed charging is performed using a CHADEMO charger in a vehicle including the CHADEMO vehicle inlet 10, a connector of the CHADEMO charger may be connected to the CHADEMO vehicle inlet 10 without use of the gender converter 20 and then charge may be performed in the same way as in the related art.

Furthermore, when a vehicle performs high-speed charging using the combo charger 30, the CHADEMO vehicle inlet 10 may be connected to the CHADEMO outlet 23 of the gender converter 20, the connectors 31 and 32 of the combo charger 30 may be connected to the combo inlets 21 and 22 of the gender converter 20 and, then, charging may be performed. In particular, when the CHADEMO outlet 23 of the gender converter 20 is connected to the CHADEMO vehicle inlet 10, vehicle controllers, i.e., a charge control module (CCM) 3 and an on-board charger (OBC) controller 4 may be configured to communicate (e.g., PLC) with the combo charger 30 via pin #3 of the CHADEMO vehicle inlet 10 during charging.

In addition, during charging, the vehicle controllers, that is, the CCM 3 and the OBC controller 4, and a battery management system (BMS) 5 may be configured to recharge a vehicle battery at high speed with DC charge power supplied from the combo charger 30 according to communication with each other (e.g., high speed CAN communication) and cooperative control. Accordingly, according to exemplary embodiments of the present invention, a controller within a vehicle may be configured to communicate with a charger via a gender converter to perform high-speed charging control.

Figure 5:
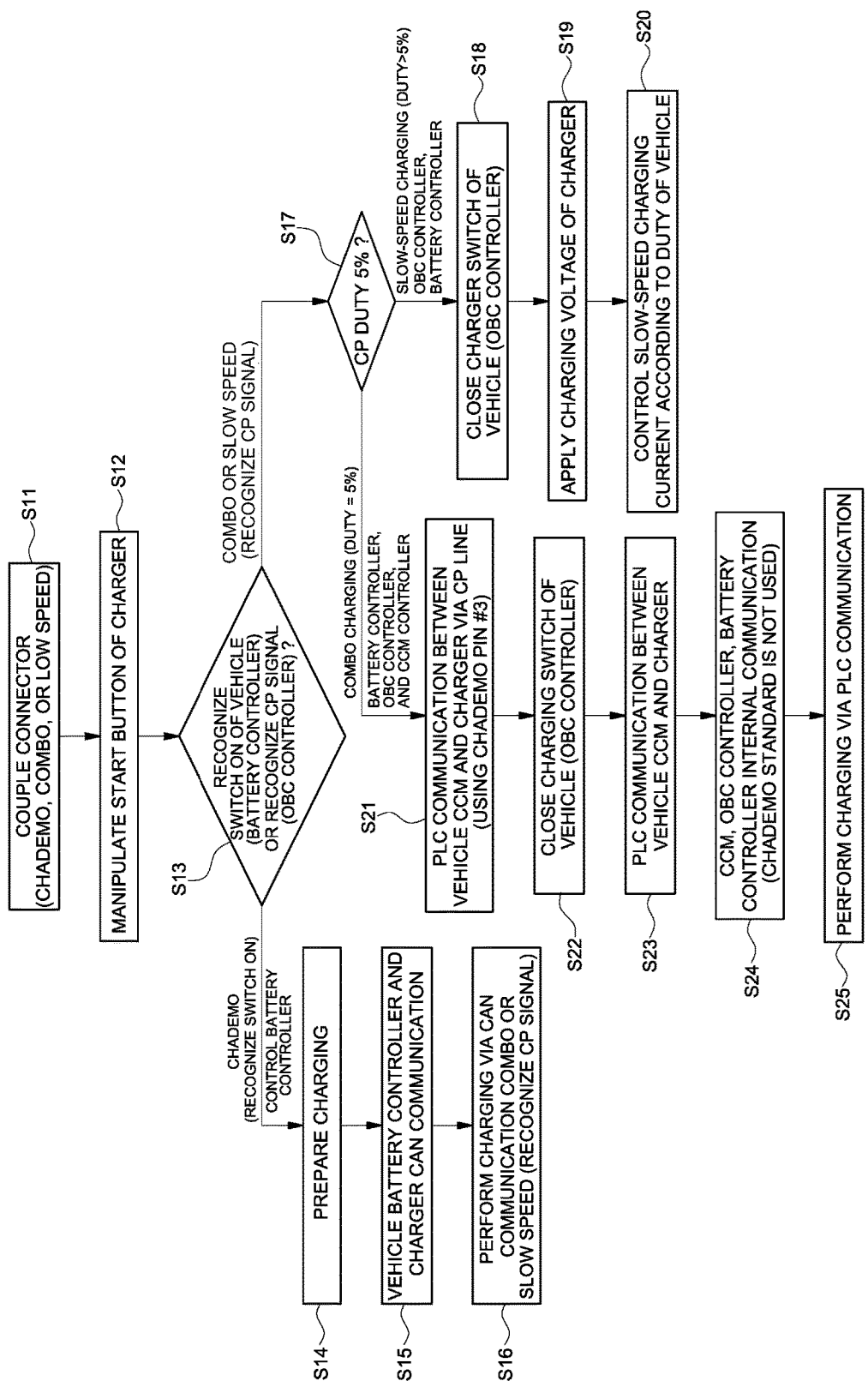
FIG. 5 is a flowchart illustrating a charging method according to exemplary embodiments of the present invention.
Figure 6:
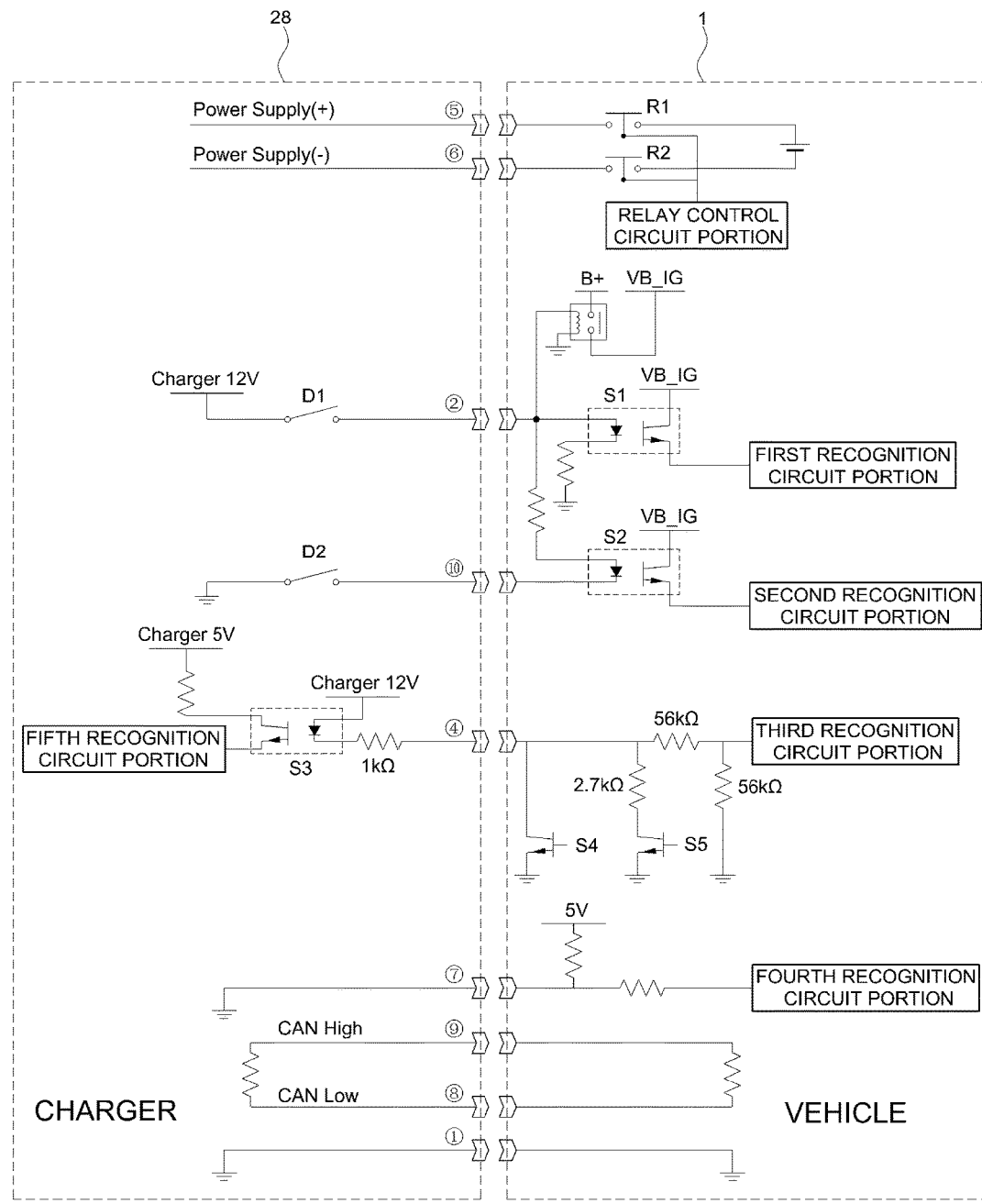
FIG. 6 is a circuit diagram illustrating a configuration of an interface circuit of the CHADEMO charging standard according to the related art.

Hereinafter, a charging method according to exemplary embodiments of the present invention will be described. The following method may be executed by a controller (e.g., an upper or high-level controller) having a processor and a memory. FIG. 5 is a flowchart illustrating a charging method according to exemplary embodiments of the present invention and FIG. 6 is a circuit diagram illustrating a configuration of an interface circuit of the CHADEMO charging standard.

First, as illustrated in FIG. 5, a connector of a charger may be connected to a vehicle (S11). In particular, for high-speed charging of a vehicle battery 2, the connectors 31 and 32 of the combo charger 30 may be coupled to the vehicle inlet 10 or a connector of the CHADEMO charger 28 may be coupled to the vehicle inlet 10 (see FIG. 3) and, the vehicle inlet 10 may be a CHADEMO inlet. For slow-speed charging of the vehicle battery 2, the low-speed charging equipment 29 using commercial alternating current (AC) power connected to a distribution system may be connected to the vehicle 1 (refer to FIG. 3). In particular, a connector of the low-speed charging equipment 29 may be connected to a different vehicle inlet from that used for high-speed charging, that is, a slow-speed inlet (not shown) included within the vehicle 1 separately from the CHADEMO vehicle inlet 10.

Further, when the charger connected to the vehicle 1 is the CHADEMO charger 28, that is, when a connector of the CHADEMO charger 28 is connected and coupled directly to the CHADEMO vehicle inlet 10 without use of the gender converter 20, when a charging start button of a charger is manipulated (S12), a charging start switch in the CHADEMO charger 28 may be turned on (e.g., a charger wake-up state) and the switch-on signal may be applied via a connector and pin #2 of the CHADEMO vehicle inlet 10. Accordingly, the BMS 5 may be configured to recognize the switch-on state of the charger, that is, a wake-up state of the CHADEMO charger 28.

When a charger connected to the vehicle 1 is the combo charger 30, that is, when the CHADEMO vehicle inlet 10 and the connectors 31 and 32 of the combo charger 30 are connected and coupled via the gender converter 20, when the charging start button of the charger is manipulated (S12), a CP signal may be applied from the combo charger 30 via a CP terminal of the connectors 31 and 32, a CP terminal of the combo inlets 21 and 22 in the gender converter 20, terminal #3 of the CHADEMO outlet 23, and pin #3 of the CHADEMO vehicle inlet 10. Accordingly, the OBC controller 4 may be configured to recognize the CP signal input via pin #3 of the CHADEMO vehicle inlet 10. Additionally, when a connector of the low-speed charging equipment 29 is coupled to a low-speed inlet of the vehicle 1, when a charging start button of the low-speed charging equipment 29 is manipulated (S12), a CP signal may be applied via the connector of the low-speed charging equipment 29 and the slow-speed inlet and, thus, the OBC controller 4 may be configured to recognize the CP signal.

After the charging start button is manipulated (S12), when the BMS 5 determines that the switch-on signal is applied from the CHADEMO charger 28 via pin #2 of the CHADEMO vehicle inlet 10 in operation S13 and recognizes a wake-up state of the CHADEMO charger 28, a charging preparation procedure may be performed by the BMS 5 (S14) and, then, CAN communication between the BMS 5 of the vehicle 1 and the charger may be executed and high-speed charging of the vehicle battery 2 may be performed via the CAN communication (S16). In particular, the CCM 3 and the OBC controller 4 of the vehicle 1 and the BMS 5 may be configured to perform cooperative control for high-speed charging through high-speed CAN communication and, thus, the battery 2 may be normally recharged at high speed with DC power supplied from the CHADEMO charger 28.

With reference to FIG. 6, a CHADEMO standard type charging procedure performed when a connector of the CHADEMO charger 28 is connected to the CHADEMO vehicle inlet 10 will be described. The circuit configuration illustrated in FIG. 6 is a known circuit configuration. In this regard, when a connector of the CHADEMOc harger 28 is coupled to the CHADEMO vehicle inlet 10 and then a start button of a charger is manipulated, a switch D1, as a charging start switch, is turned on (e.g., a charger wake-up state) and then a switch-on signal may be applied via a connector and pin #2 of the CHADEMO vehicle inlet 10.

Accordingly, a first recognition circuit portion of the BMS 5 may be configured to recognize an on state of a switch 51 and a battery controller may be configured to recognize a wake-up state of the CHADEMO charger 28. Then, a charger and a vehicle may be configured to communicate (e.g., CAN communication) via a connector and pins #8 and #9 of a CHADEMO inlet, a switch S4 of a vehicle may be turned on (e.g., a switch S5 is turned on in the case of SGS specification) and, then, a switch-on signal may be applied to a charger via a connector and pin #4 of the inlet.

Thus, a switch S3 of a charger may be turned on according to the switch-on signal, a fifth recognition circuit portion of the charger may be configured to detect the turning on of the switch S3 to check insulation and, then a switch D2 (which is not used in the case of SGS specification) may be turned on. Accordingly, when the switch D2 is turned on, a second recognition circuit portion of the BMS 5 of a vehicle may be configured to detect the switch-on of the switch D2 and turn on high-speed charging relays (EV contactors) R1 and R2 through a relay control circuit portion. Additionally, DC charging power may be supplied to the battery 2 of the vehicle 1 from the charger via a connector and pins #5 and #6 of the CHADEMO vehicle inlet 10 to perform high-speed charging.

The CHADEMO charging method is a known method. In response to detecting a CP signal in operation S13, the OBC controller 4 may be configured to determine that a CP signal is applied to a vehicle from the combo charger 30 through the gender converter 20 and recognize that a charger currently connected to a vehicle is the combo charger 30. In particular, for slow-speed charging, a CP signal may be applied from the low-speed charging equipment 29 and, thus, the OBC controller 4 may be configured to differentiate whether a current state is a state in which the vehicle 1 is connected to the combo charger 30 or a state in which the vehicle 1 is connected to the low-speed charging equipment 29, according to the CP signal.

In other words, whether a duty of the CP signal (which is a PWM signal) is a preset standard duty value or a value greater than the standard duty value may be determined by the controller (S17). When the duty of the CP signal is a standard duty value (Duty=5%), the controller may be configured to determine that the vehicle 1 is connected to the combo charger 30 through the gender converter 20. When the duty of the CP signal is a value greater than a standard duty value (Duty>5%), the controller may be configured to determine that the vehicle 1 is connected to the low-speed charging equipment 29.

When connection with the low-speed charging equipment 29 is detected, the vehicle battery 2 may be recharged at slow speed by AC charging power supplied from the low-speed charging equipment 29 under cooperative operation of the OBC controller 4 and the BMS 5. In particular, a charge switch of a vehicle may be turned off by the OBC controller 4 (S18) and, thus, as a charging voltage may be applied from the low-speed charging equipment 29 (S19), the OBC controller may be configured to perform slow-speed charge current control on a vehicle slow-speed charger (OBC) based on a duty (S20).

When connection with the combo charger 30 is determined according to the CP signal, the battery 2 may be recharged at high speed with DC charging power supplied from the combo charger 30 under cooperative operation of the OBC controller 4, the BMS 5, and the CCM 3. In other words, PLC communication may be performed between the combo charger 30 and the CCM 3 of a vehicle using a CP communication line and pin #3 of the CHADEMO vehicle inlet 10 through the gender converter 20 (S21) and, then, a charge switch of the vehicle may be turned off by the OBC controller 4 (S22).

Further, PLC communication may be performed between the CCM 3 and the charger 30 and battery charging may be performed via PLC communication between the charger 30 and a vehicle under cooperative operation of the CCM 3, the OBC controller 4, and the BMS 5, configured to communicate via high-speed CAN (S23, S24, and S25). In particular, the vehicle 1 may be configured to receive DC charging power from the combo charger 30 through the gender converter 20 to perform high-speed charging of the battery 2.

Accordingly, according to exemplary embodiments of the present invention, one vehicle may use both CHADEMO and DC combo and it may be possible to develop a vehicle model with a single inlet without a problem in that a vehicle needs to be classified and manufactured according to the charging methods. In particular, one vehicle uses both chargers of CHADEMO and DC combo and, thus, problems in terms of charging infrastructure expansion may be overcome.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A charging apparatus of an electric vehicle, comprising:
a gender converter connected between a vehicle inlet and a connector of a charger of at least one of a plurality of standard specification chargers having different charging methods to supply direct current (DC) power for battery charging, communication, and ground connection between a connected charger and the vehicle; and
a controller configured to determine specifications of the charger connected to the vehicle inlet from a signal transmitted from the charger and perform high-speed charging according to specifications of the connected charger to perform high-speed charging of a vehicle battery with DC power supplied from the charger, wherein the vehicle controller is configured to determine that the charger connected to the vehicle inlet is a standard specification charger with a communication interface for DC charging via a connection between the electric vehicle and a high-speed charger when a charging start button of a charger is manipulated and a charging start switch in the charger is turned on to receive a switch-on signal from the charger.

2. The apparatus of claim 1, wherein the charger connected to the gender converter is a DC combo standard specification charger and the vehicle inlet is an inlet of the standard specification charger with the communication interface for DC charging via the connection between the electric vehicle and the high-speed charger.

3. The apparatus of claim 1, wherein the gender converter includes:
   an inlet connected and coupled to a connector of one of a DC combo standard specification charger and the standard specification charger with the communication interface for DC charging via the connection between the electric vehicle and the high-speed charger;
   an outlet to be connected to the vehicle inlet of the other of the DC combo standard specification charger and the standard specification charger with the communication interface for DC charging via the connection between the electric vehicle and the high-speed charger; and
   a communication line, a ground line, and a DC power line, for connection between terminals of the inlet and terminals of the outlet.

4. The apparatus of claim 3, wherein the communication line is used to connect a control pilot (CP) terminal of the inlet and a terminal connected to an unused pin of the vehicle inlet in the outlet.

5. The apparatus of claim 1, wherein the vehicle controller is configured to determine that the charger connected through the gender converter is a DC combo standard specification charger when a control pilot (CP) signal is transmitted and input from the charger through the gender converter.

6. The apparatus of claim 1, wherein the vehicle controller is configured to determine that the charger connected through the gender converter is a DC combo standard specification charger when a control pilot (CP) signal is transmitted and input from a charger through the gender converter and a duty of the input CP signal is equal to a preset standard duty value.

7. The apparatus of claim 6, wherein the vehicle controller is configured to determine that slow-speed charging equipment is connected through a slow-speed inlet within the vehicle and is configured to execute slow-speed charging of the vehicle battery when a control pilot (CP) signal is input from a charger and a duty of the input CP signal is a value greater than the preset standard duty value.

8. A charging method of an electric vehicle, comprising:
   connecting a gender converter between a vehicle inlet and a connector of one of a plurality of standard specification chargers having different charging methods;
   determining, by a controller, specifications of the charger connected to the vehicle inlet from a signal transmitted from the connected charger; and
   executing, by the controller, high-speed charging according to specifications of the connected charger to perform high-speed charging of a vehicle battery with direct current (DC) power supplied from the charger,
   wherein the controller is configured to determine that the charger connected to the vehicle inlet is the standard specification charger with a communication interface for IX charging via a connection between the electric vehicle and a high-speed charger when a charging start button of a charger is manipulated and a charging start switch in the charger is turned on to receive a switch-on signal from the charger.

9. The method of claim 8, wherein the charger connected to the gender converter is a DC combo standard specification charger and the vehicle inlet is an inlet of a standard specification charger with the communication interface for DC charging via the connection between the electric vehicle and the high-speed charger.

10. The method of claim 8, wherein the gender converter includes:
    an inlet connected and coupled to a connector of one of a DC combo standard specification charger and the standard specification charger with the communication interface for DC charging via the connection between the electric vehicle and the high-speed charger;
    an outlet to be connected to the vehicle inlet of the other of the DC combo standard specification charger and the standard specification charger with the communication interface for DC charging via the connection between the electric vehicle and the high-speed charger; and
    a communication line, a ground line, and a DC power line, for connection between terminals of the inlet and terminals of the outlet.

11. The method of claim 8, wherein the controller is configured to determine that the charger connected through the gender converter is a DC combo standard specification charger when a control pilot (CP) signal is transmitted and input from the charger through the gender converter.

12. The method of claim 8, wherein the controller is configured to determine that the charger connected through the gender converter is a DC combo standard specification charger when a control pilot (CP) signal is transmitted and input from a charger through the gender converter and a duty of the input CP signal is equal to a preset standard duty value.

13. The method of claim 12, wherein the controller is configured to determine that slow-speed charging equipment is connected through a slow-speed inlet within the vehicle and execute slow-speed charging of the vehicle battery when a control pilot (CP) signal is input from a charger and a duty of the input CP signal is a value greater than the preset standard duty value.

* * * * *